J. L. & D. H. COLES.

Mechanical Movement.

No. 5,178.

Reissued Dec. 10, 1872.

Witnesses.
Chas. Walters.
Ernst Bilhuber.

Inventors.
John L. Coles
David H. Coles
per
Van Santvoord & Hewitt
Attys

AM. PHOTO-LITHOGRAPHIC CO. N.Y. (OSBORNE'S PROCESS.)

UNITED STATES PATENT OFFICE.

JOHN L. COLES AND DAVID H. COLES, OF NEW YORK, N. Y., ASSIGNORS, BY MESNE ASSIGNMENTS, OF PART INTEREST TO S. W. JOHNSON, SPENCER H. SMITH, NORMAN CAMPBELL, A. G. DARWIN, AND CARL JUSSEN.

IMPROVEMENT IN MECHANICAL MOVEMENTS.

Specification forming part of Letters Patent No. 83,133, dated October 20, 1868; reissue No. 5,178, dated December 10, 1872.

DIVISION B.

*To all whom it may concern:*

Be it known that we, JOHN L. COLES and DAVID H. COLES, both of the city, county, and State of New York, have invented a new and useful Improvement in Mechanism for Changing Motion; and we do hereby declare the following to be a full, clear, and exact description thereof, which will enable those skilled in the art to make and use the same, reference being had to the accompanying drawing forming part of this specification, in which drawing—

Figure 1:
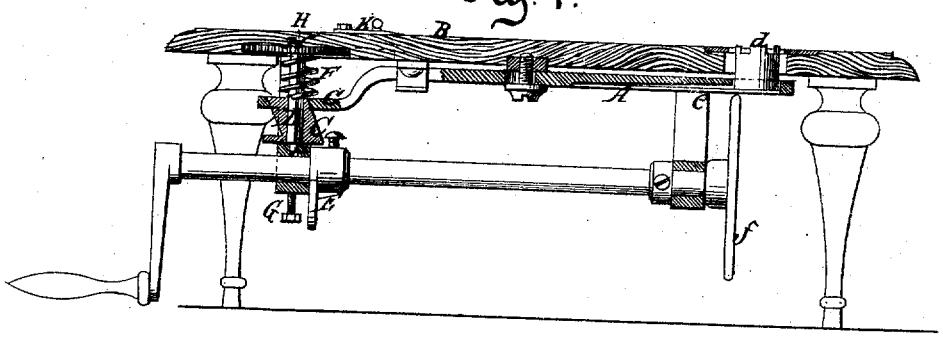
Figure 2:
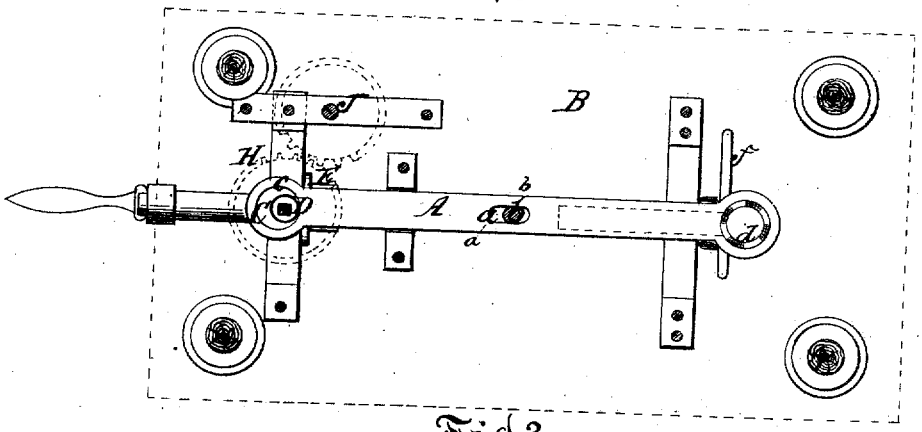
Figure 3:
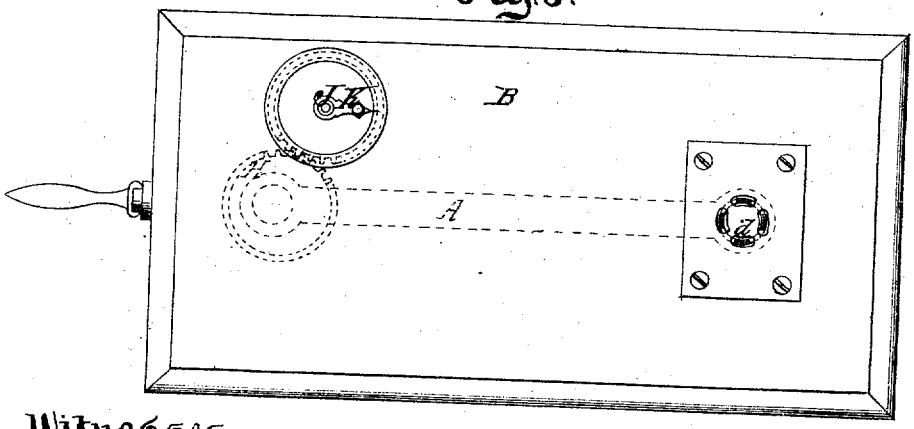

Figure 1 represents a sectional side elevation of this invention; Fig. 2 is a horizontal section thereof; and Fig. 3 is a plan or top view of the same.

Similar letters indicate corresponding parts.

This invention consists in the combination of a cam-slide with a bar or lever that is free to oscillate, and also to slide on its fulcrum, said cam-slide being feathered on an arbor which can be revolved in such a manner that by imparting a reciprocating motion to the cam-slide an oscillating or reciprocating motion is given to the bar or lever, and that by turning the arbor of the cam slide the motion of the bar or lever can be changed at any moment, and that by connecting said bar or lever to different mechanisms various effects can be produced. An adjusting-screw serves to regulate the throw of the cam-slide and the amount of motion imparted to the bar or lever.

In the drawing, the letter A designates a bar or lever, which is provided with a slot, *a*, through which passes a screw, *b*, which screws into the table B, or in any fixed part of a machine, so that said bar is free to oscillate or to assume a reciprocating motion on its fulcrum-pin *b*. The rear end of the bar or lever A forms a ring or eye, *c*, which embraces the cam-slide C. This slide consists of a cylinder placed in an oblique position on the rod D, and it is subjected to the action of a cam, E, and of a spring, F, which spring has a tendency to press the cam-slide toward the face of the cam. By the combined action of the cam and spring the cam-slide receives a reciprocating motion through the eye of the bar or lever A, compelling said bar to assume a reciprocating or an oscillating motion corresponding to the obliquity of the cam-slide. By a screw, G, the cam-slide can be set closer to or further from the cam E, and thereby the throw of the cam-slide, and consequently the amount of motion imparted to the bar or lever A, is changed. On the rod D, which forms the guide of the cam-slide, is mounted a cog-wheel, H, which gears into another cog-wheel I, mounted on an arbor, J, which projects up through the table B, and to the upper end of which is secured a handle, K, which sweeps over a dial-plate inserted into or marked on the table. By turning this handle the rod D and also the cam slide are turned, and the motion of the bar or lever A is changed, the handle being adjusted in such a manner that it indicates the direction in which the bar or lever A moves. The bar or lever A connects with the feed-dog of a sewing-machine, or with any other mechanism the motion of which is to be changed, and a simple and compact device is thereby produced for effecting manifold changes in the motion of those parts to which said bar or lever may be attached.

What we claim as new, and desire to secure by Letters Patent, is—

1. The combination of a cam-slide with a bar or lever that is free to oscillate and also to slide on its fulcrum, said cam-slide being feathered on an arbor which can be revolved, substantially as and for the purpose herein shown and described.

2. The combination of an adjusting-screw with a cam-slide which is feathered on an arbor that can be revolved, and with a bar or lever that is free to oscillate and also to slide on its fulcrum, substantially as and for the purpose set forth.

3. A bar or lever which is free to oscillate and also to slide on its fulcrum, in combination with a cam-slide and with mechanism for turning the same, substantially in the manner and for the purpose described.

J. L. COLES.
DAVID H. COLES.

Witnesses:
W. HAUFF,
E. F. KASTENHUBER.